US012380920B2

(12) United States Patent
Zhang et al.

(10) Patent No.: US 12,380,920 B2
(45) Date of Patent: Aug. 5, 2025

(54) LOAD BEAM LIMITER TABS FOR HAMR HEAD SLIDER PROTECTION

(71) Applicant: Magnecomp Corporation, Murrieta, CA (US)

(72) Inventors: Long Zhang, Winchester, CA (US); Kuen Chee Ee, Chino, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/131,612

(22) Filed: Apr. 6, 2023

(65) Prior Publication Data

US 2023/0326483 A1 Oct. 12, 2023

Related U.S. Application Data

(60) Provisional application No. 63/329,827, filed on Apr. 11, 2022.

(51) Int. Cl.
*G11B 5/48* (2006.01)
*G11B 5/00* (2006.01)

(52) U.S. Cl.
CPC .......... *G11B 5/4833* (2013.01); *G11B 5/4826* (2013.01); *G11B 2005/0021* (2013.01)

(58) Field of Classification Search
CPC ............... G11B 5/4833; G11B 5/4826; G11B 2005/0021
See application file for complete search history.

(56) References Cited

U.S. PATENT DOCUMENTS

| | | | |
|---|---|---|---|
| 6,351,350 B1 | 2/2002 | Symons et al. | |
| 6,424,498 B1 * | 7/2002 | Patterson | G11B 5/4826 |
| 6,556,383 B2 | 4/2003 | Murphy et al. | |
| 6,995,953 B2 * | 2/2006 | Mahoney | G11B 5/4826 |
| 8,614,933 B2 * | 12/2013 | Schreck | G11B 5/5582 |
| | | | 369/13.13 |
| 8,902,546 B1 * | 12/2014 | Takayama | G11B 5/314 |
| | | | 360/234.4 |
| 9,153,275 B1 * | 10/2015 | Naniwa | G11B 5/4833 |
| 11,056,137 B1 * | 7/2021 | Teo | G11B 25/043 |
| 11,211,084 B1 * | 12/2021 | Zeng | G11B 5/607 |
| 2012/0182844 A1 * | 7/2012 | Schreck | G11B 5/6088 |
| | | | 29/603.07 |

(Continued)

FOREIGN PATENT DOCUMENTS

JP  9-282823 A  10/1997
JP  2004-70994 A  3/2004

OTHER PUBLICATIONS

International Search Report and Written Opinion in International Application No. PCT/US2023/018075, mailed Jul. 27, 2023.

(Continued)

*Primary Examiner* — Craig A. Renner
(74) *Attorney, Agent, or Firm* — DLA Piper LLP (US)

(57) ABSTRACT

Examples of a load beam are provided. The load beam includes a base portion with an opening at a distal end. The opening is configured to receive a heat assisted magnetic recording (HAMR) head slider extending therethrough. The load beam also includes at least one load beam tab such that the load beam tab is further away from the base portion and a top surface of the HAMR head slider.

11 Claims, 11 Drawing Sheets

(56) References Cited

U.S. PATENT DOCUMENTS

| | | | |
|---|---|---|---|
| 2013/0148231 A1* | 6/2013 | Huang | G11B 5/4813 360/59 |
| 2013/0286800 A1 | 10/2013 | Ver Meer et al. | |
| 2017/0372733 A1 | 12/2017 | McNeill et al. | |
| 2018/0137884 A1 | 5/2018 | Bennin et al. | |
| 2021/0287701 A1* | 9/2021 | Kudo | G11B 5/6088 |
| 2022/0407292 A1 | 12/2022 | Matsumoto | |

OTHER PUBLICATIONS

International Preliminary Report on Patentability in International Application No. PCT/US2023/018075, mailed Oct. 24, 2024.

* cited by examiner

LOAD BEAM LIMITER TABS FOR HAMR HEAD SLIDER PROTECTION

CROSS-REFERENCE TO RELATED APPLICATIONS

This application claims the benefit of, and priority to, U.S. Provisional Application No. 63/329,827 filed on Apr. 11, 2022, which is hereby incorporated by reference in its entirety.

FIELD

The present disclosure relates generally to a hard disk drive and particularly to an operational shock contact feature for a load beam of a suspension assembly.

BACKGROUND

A hard disk drive (HDD) includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

Figures 1, 2A, 2B:
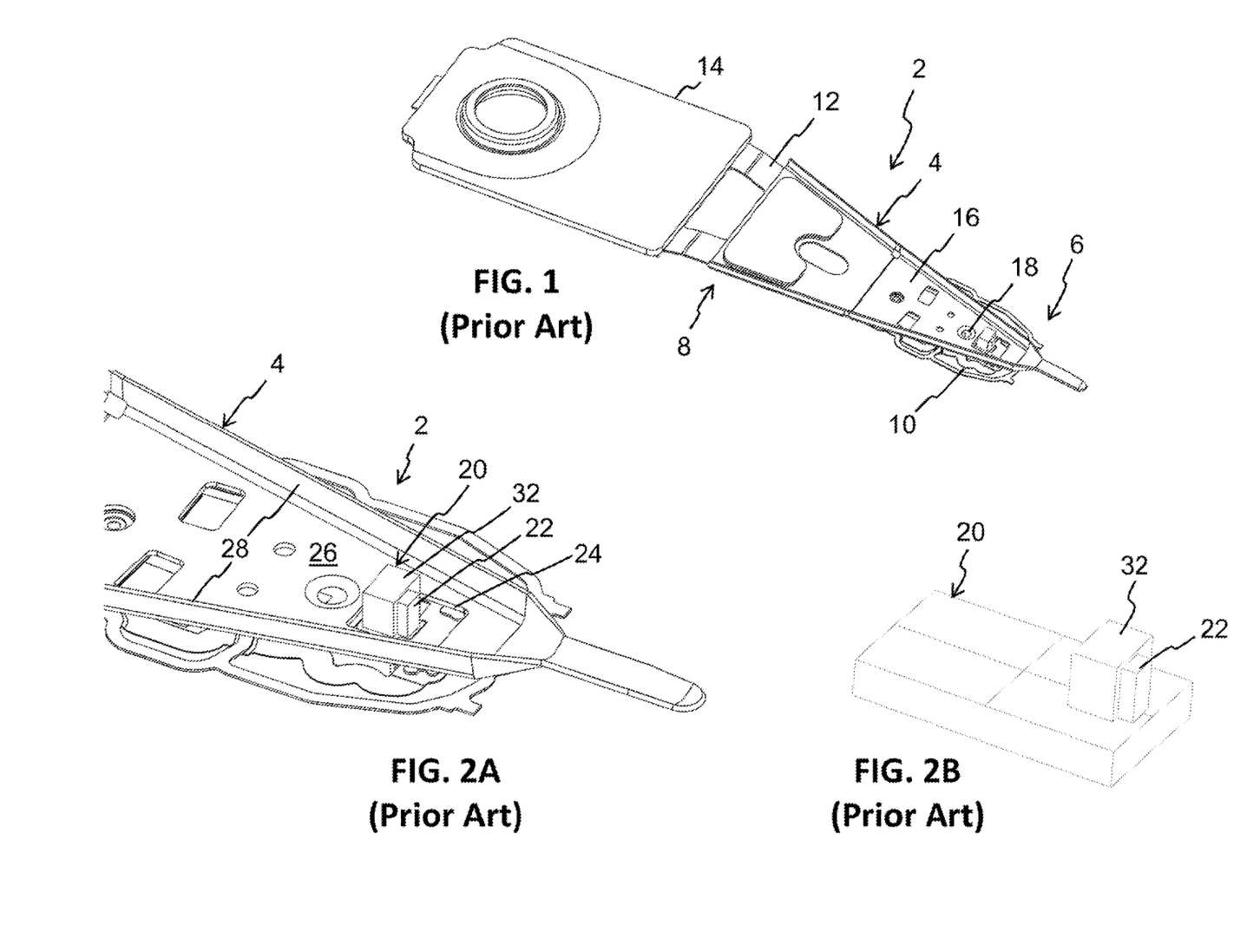
FIG. 1 is an isometric view of a conventional hard disk drive (HDD) suspension.
FIG. 2A is an isometric view of the conventional suspension of FIG. 1.
FIG. 2B is a perspective view of the HAMR head slider of FIG. 2A.

FIGS. 1, 2A and 2B illustrate a conventional hard disk drive (HDD) suspension 2 that includes a load beam 4 with an unattached distal end 6 and an attached proximal end 8. The suspension 2 includes a gimbal assembly 10 mounted proximate to the distal end 6 of load beam 4, and includes a slider configured with a read/write head to store digital information on a rigid rotating disk. The load beam 4 may be semi-rigid and formed of stainless-steel, and can include a hinge member 12 that is attached to a mount plate 14.

The load beam 4 can include a sag area 16 between the hinge member 12 and the gimbal assembly 10, and a dimple 18 located at the gimbal assembly 10. A heat assisted magnetic recording (HAMR) head slider 20 is attached to the gimbal assembly 10 near the distal end 6 of load beam 4. The HAMR head slider 20 can include a laser light source 22 (e.g., a laser diode) and a slider submount 32. The HAMR head slider 20 can extend through an opening 24 in the load beam 4. The load beam 4 includes a generally planar base portion 26 that includes at least the opening 24, and side rails 28 extending from the edges of the base portion 26 (e.g., extending in the same direction as does the HAMR head slider 20 and laser light source 22).

The load beam 4 can be manufactured from planar stainless-steel sheets that are subsequently chemically etched to form its two-dimensional design within the limitations of process tolerances. Typical etched features are holes, slots, beams and hinges. The flat patterned stainless-steel sheets are then formed into desired three-dimensional shapes.

HAMR technology is incorporated to increase the areal density of the hard disk drive. Different from the conventional perpendicular magnetic recording (PMR) technology, the HAMR head slider 20 may include the laser light source 22 (e.g., laser diode) which generates heat on the spinning disk to reduce the coercivity of the disk media for the magnetic writing.

Figure 3:
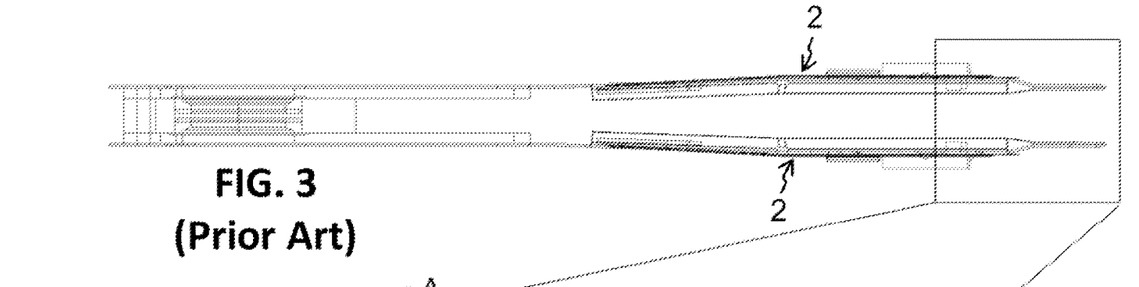
FIG. 3 is a side view of a pair of the conventional hard disk drive (HDD) suspensions of FIG. 1.
Figure 4:
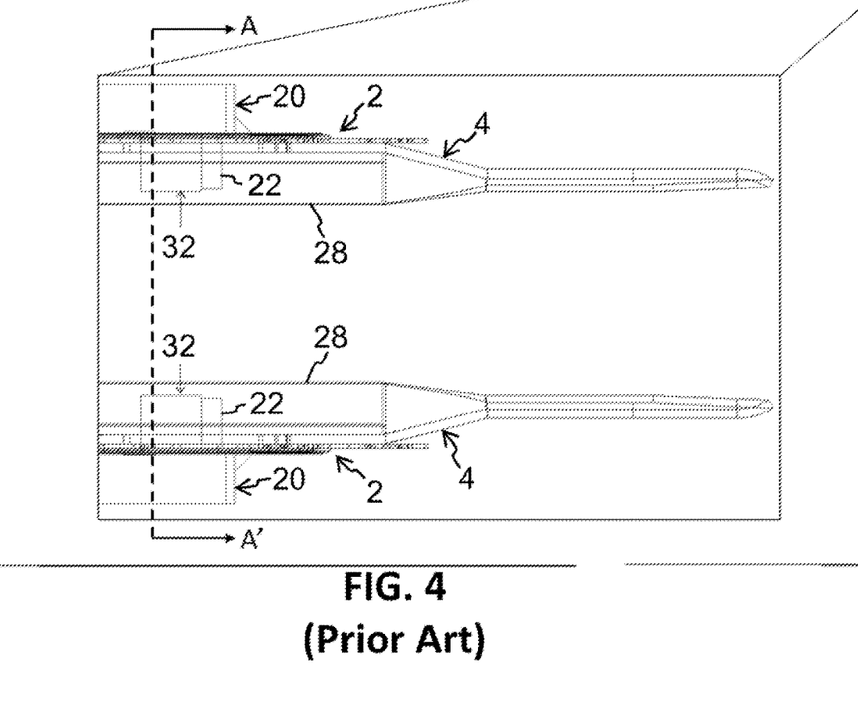
FIG. 4 is a close-up view of the distal portions of the conventional suspensions of FIG. 3.

FIG. 3 is a side view of a pair of the hard disk drive (HDD) suspensions 2, and FIG. 4 is an exploded view of the end portions of the suspensions in FIG. 3. The upper suspension 2 shown in FIG. 3 has its HAMR head slider 20, slider submount 32, laser light source 22 and side rails 28 extending downwardly away from its base portion 26, and lower suspension 2 shown in FIG. 3 has its HAMR head slider 20, slider submount 32, laser light source 22 and side rails 28 extending upwardly away from its base portion 26. While two suspensions 2 are illustrated in FIG. 3, it should be understood that multiple pairs of suspensions 2 may be included in a single hard disk drive (HDD). As shown in FIG. 3, for each suspension 2, the height of the HAMR head slider submount 32 and laser light source 22 relative to the base portion 26 is less than the height of the side rails 28 (i.e., the HAMR head slider submount 32 and laser light source 22 do not extend beyond the side rails 28). This means that should the pair of suspensions 2 collide with each other (e.g., during an extreme shock event), the side rails 28 are meant to collide with each other and absorb the energy of the impact, avoiding any potential contact between opposing HAMR head slider submounts 32 and/or laser light sources 22 which could result in damage to these components.

Figure 5A:
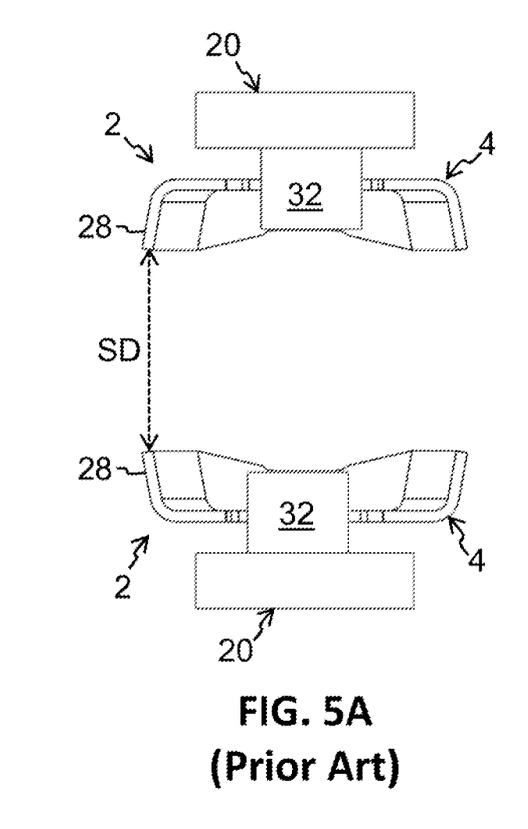
FIG. 5A is a cross-sectional side view at A-A' of FIG. 4, illustrating a pair of the conventional suspensions of FIG. 1 disposed in an opposing configuration.
Figure 5B:
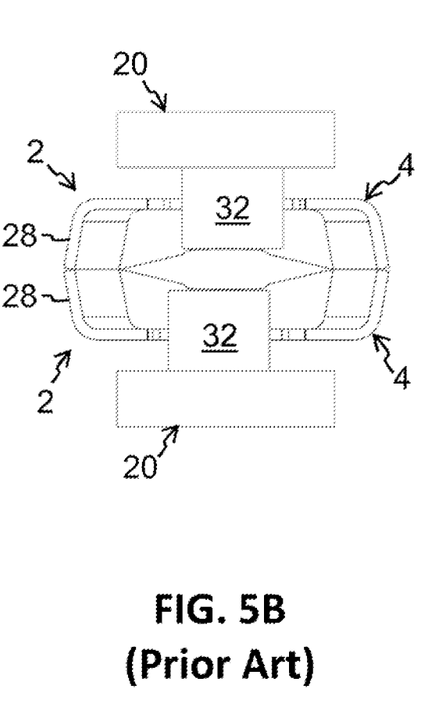
FIG. 5B is a cross-sectional side view of the pair of the opposing conventional suspensions of FIG. 5A, in contact with each other and in an aligned state.
Figure 5C:
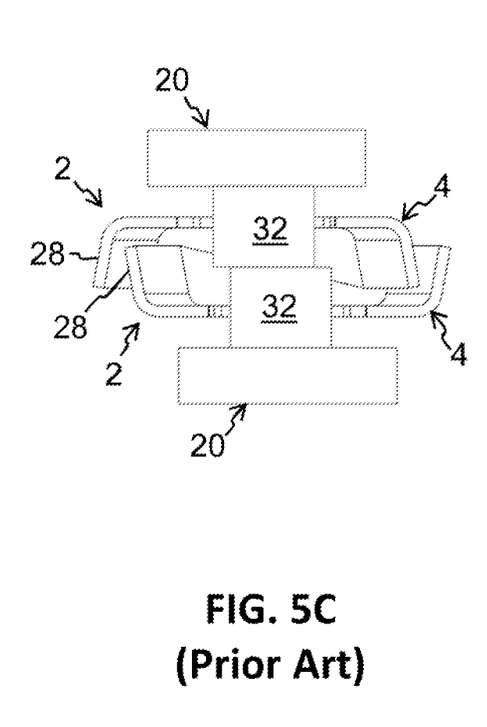
FIG. 5C is a cross-sectional side view of the pair of the opposing conventional suspensions of FIG. 5A, in contact with each other and in a misaligned state.

FIG. 5A is a cross-sectional view along line A-A' of FIG. 4 illustrating the pair of opposing suspensions 2 of FIG. 4. In operation (e.g., when in the parked position or in the process of being placed in the parked position), the side rails 28 of the opposing suspensions 2 are separated by a separation distance SD. However, during a shock event to the hard disk drive (HDD), the pair of suspensions 2 can be deflected where they contact each other, as shown in FIG. 5B. When this occurs, it is desired that side rails 28 of the opposing suspensions 2 collide with each other to absorb the energy of the collision, sparing the HAMR head slider submount 32 and/or laser light source 22 from any direct collision with components on the opposing suspension 2, which could damage these components. As shown in FIG. 5B, so long as the pair of suspensions 2 maintain alignment to each other, then the side rails 28 can collide. However, given that the side rails 28 are relatively thin, and shock events can originate from any direction, it is possible during a shock event that the pair of suspensions 2 become misaligned relative to each other, whereby the opposing side rails 28 do not collide with each other, as illustrated in FIG. 5C. It is also possible that misalignment may occur because of excessive manufacturing tolerances. When misalignment occurs at the time of collision, it is possible that opposing HAMR head slider submounts 32 and/or laser light sources 22 collide with each other during a shock event, causing damage to these components.

Accordingly, there is a need to improve upon these stated performance traits.

SUMMARY

Examples of a load beam are provided. The load beam includes an opening at a distal end. The opening is configured to receive a heat assisted magnetic recording (HAMR) head slider extending therethrough. The load beam also includes at least one load beam tab disposed at a higher position from a base portion of the load beam than the height of the HAMR head slider.

In further examples, a suspension is provided. The suspension includes a load beam comprising a base portion with an opening formed therein, and a pair of side rails extending from the base portion, wherein each of the side rails terminates in a distal edge. The opening is configured to receive a heat assisted magnetic recording (HAMR) head slider extending through the opening. In some examples, a tab is provided that extends from an edge of the opening, wherein the tab extends further away from the base portion than does the heat assisted magnetic recording (HAMR) head slider when extending through the opening. In some examples, the side rails extend further away from the base portion than does the tab. In other examples, the side rails extend an equal distance away from the base portion as does the tab.

In an additional example, a suspension is provided comprising: a load beam having a base portion with a first opening formed therein, and a pair of side rails extending from the base portion, wherein each of the side rails terminates in a distal edge. The first opening is configured to receive a heat assisted magnetic recording (HAMR) head slider extending through the first opening. A second opening is formed in the base portion, and a tab extends from an edge of the second opening. The tab may include an inclined section extending from the edge of the second opening, and a distal section that is generally planar and extends generally parallel to the base portion and over the second opening. In some examples, the distal edges are disposed further away from the base portion than the distal section. In some examples, the side rails extend an equal distance away from the base portion as does the tab.

Other features and advantages of examples of the present disclosure will be apparent from the accompanying drawings and from the detailed description that follows.

BRIEF DESCRIPTION OF THE DRAWINGS

Examples of the present disclosure are illustrated by way of example and not limitation in the figures of the accompanying drawings, in which like references indicate similar elements and in which.

DETAILED DESCRIPTION

Figure 6A:
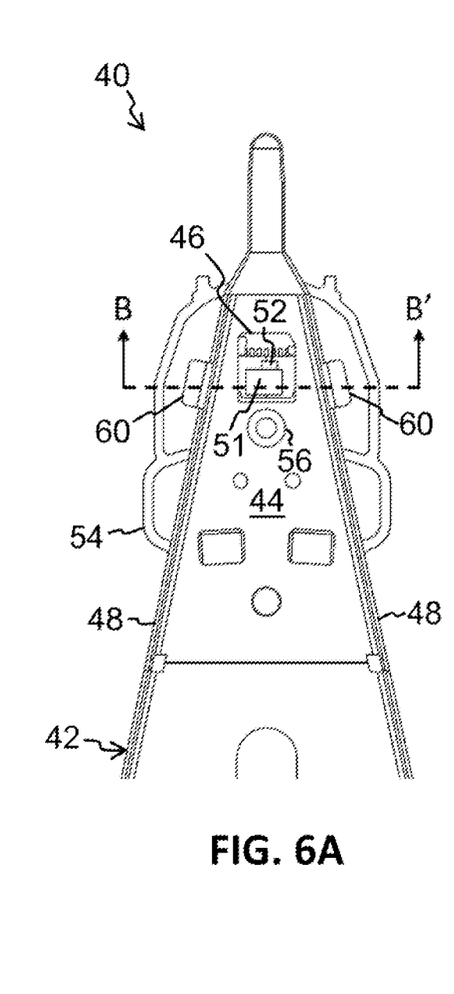
FIG. 6A is a top plan view of a suspension incorporating at least one load beam limiter tab, in accordance with an example of the disclosure.
Figure 6B:
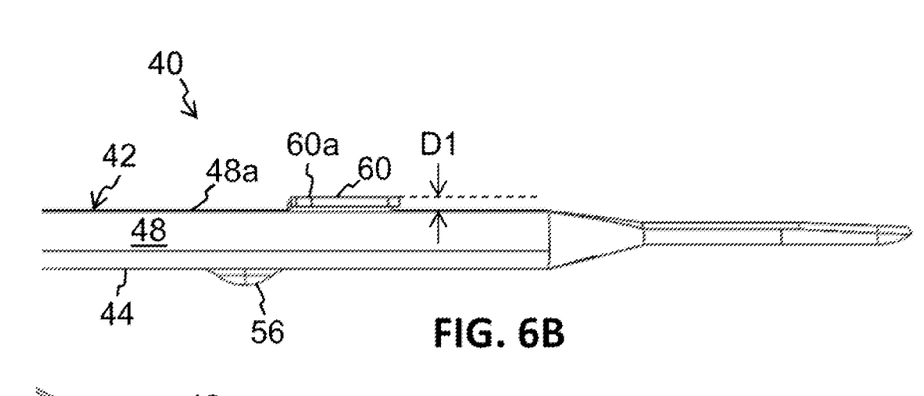
FIG. 6B is a side view of the suspension of FIG. 6A, in accordance with an example of the disclosure.
Figure 6C:
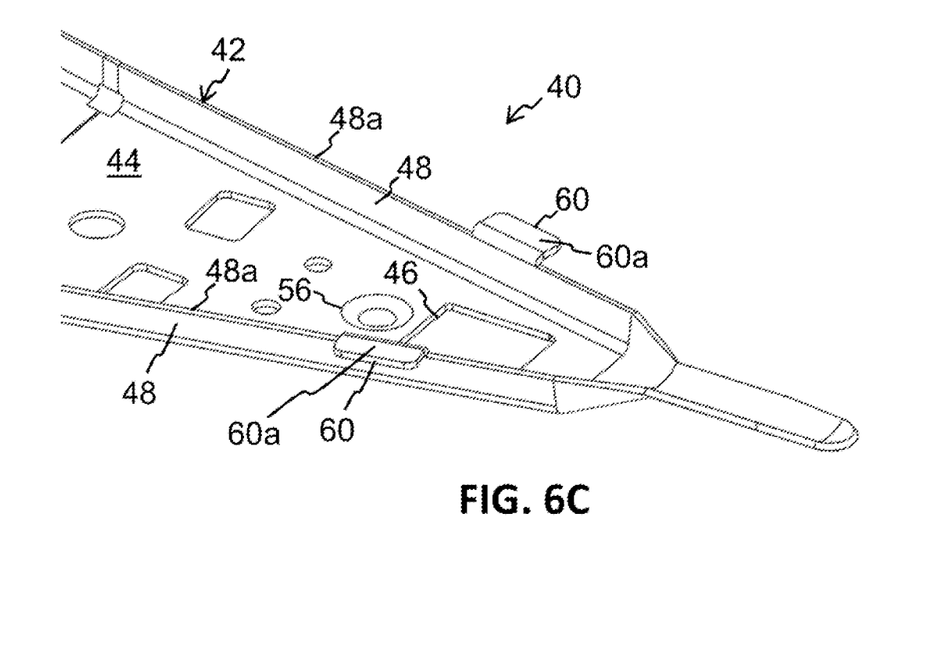
FIG. 6C is an isometric view of the suspension of FIG. 6A, in accordance with an example of the disclosure.

FIGS. 6A-6C illustrate the distal end of a load beam 42 for a suspension 40 that addresses the above identified issues. Similar to load beam 4 described above, load beam 42 includes a generally planar base portion 44 having at least an opening 46 (through which the heat assisted magnetic recording (HAMR) head slider 50, and more specifically its slider submount 51 and laser light source 52, can extend), and a pair of side rails 48 extending from the base portion 44 (e.g., extending from edges of the base portion 44) and terminating at a distal edge 48a. A gimbal assembly 54 can be attached to the distal end of the load beam 42. The base portion 44 can further include a dimple 56.

Each of the load beams 42 includes load beam limiters in the form of tabs 60 disposed at, and extending laterally from, the distal edges 48a of side rails 48. As best shown in FIG. 6C (which omits the gimbal assembly 54, HAMR head slider submount 51 and laser light source 52), each tab 60 on each side rail 48 extends laterally outwardly (i.e., laterally away from the base portion 44) in a lateral direction generally parallel to the plane of the base portion 44. The top surface 60a of the tab 60 can be planar, and is offset from the distal edge 48a of the side rail 48 by a distance D1. For each side rail 48, the corresponding tab 60 may be positioned on the distal edge 48a between the dimple 56 and the distal end of the load beam 42. The tabs 60 can be formed during the forming process of the load beam 42 without introducing additional manufacturing steps.

Figure 7A:
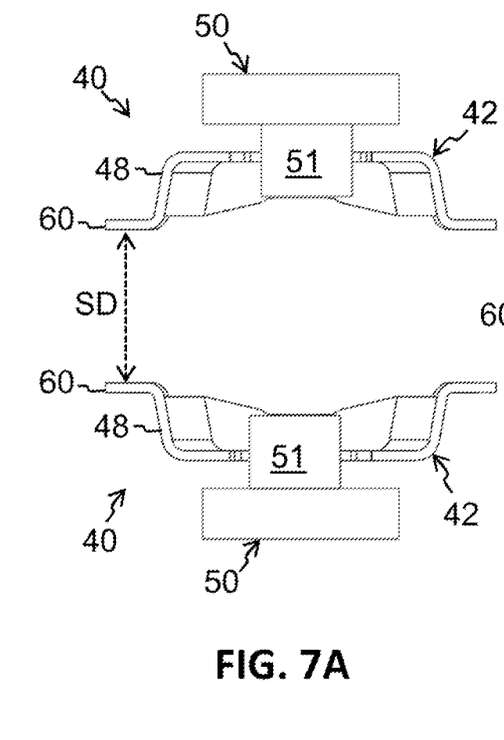
FIG. 7A is a cross-sectional side view at B-B' of FIG. 6A, illustrating a pair of the suspensions of FIG. 6A disposed in an opposing configuration.
Figure 7B:
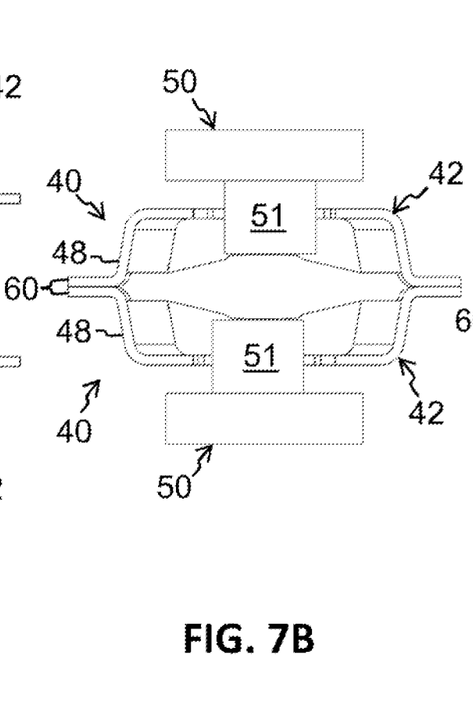
FIG. 7B is a cross-sectional side view of the pair of the opposing suspensions of FIG. 7A, in contact with each other and in an aligned state.
Figure 7C:
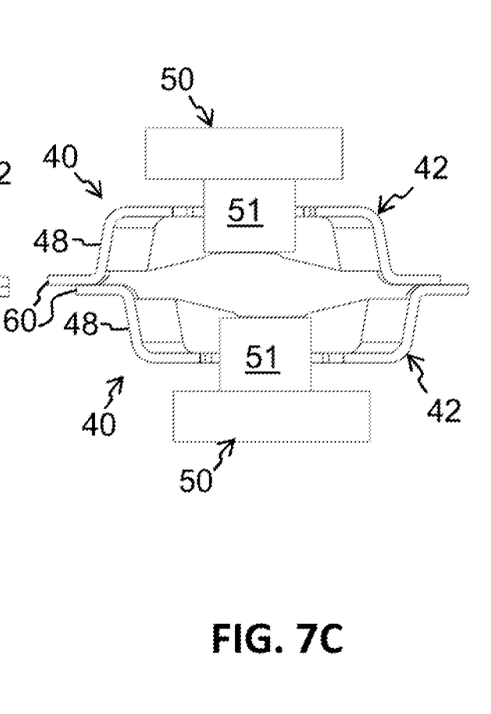
FIG. 7C is a cross-sectional side view of the pair of the opposing suspensions of FIG. 7A, in contact with each other and in a misaligned state.

FIGS. 7A-7C are cross-sectional views along line B-B' of FIG. 6A illustrating the pair of opposing suspensions 40 of FIG. 6A. In operation, the tabs 60 of the opposing suspensions 2 are separated by a separation distance SD, as shown in FIG. 7A. FIG. 7B shows the result of a shock event in which the opposing suspensions 40 remain aligned to each other as they contact each other, in which case the top surfaces 60a of tabs 60 of the opposing suspensions 40 collide together and absorb the energy the collision (without risk of opposing HAMR head slider submounts 51 and/or laser light sources 52 colliding and incurring damage). FIG. 7C shows the result of a shock event in which the opposing suspensions 40 do not remained aligned to each other, in which case the tabs 60 of the opposing suspensions 40 still collide together and absorb the energy of the collision despite the misalignment between the opposing suspensions 40, thus preventing the HAMR head slider submounts 51 and/or laser light sources 52 colliding with each other and incurring damage. The tabs 60 of the present example can prevent damage so long as the amount of misalignment between the opposing suspensions 40 is less than a width of the tabs 60. With the configuration of the present example, because the top surfaces 60a of the tabs 60 are displaced from the distal edges 48a of the side rails 48 by distance D, contact between the opposing suspensions 40 can be limited to just the tabs 60 during shock events whether or not the suspensions 40 are misaligned to each other.

Figure 8A:
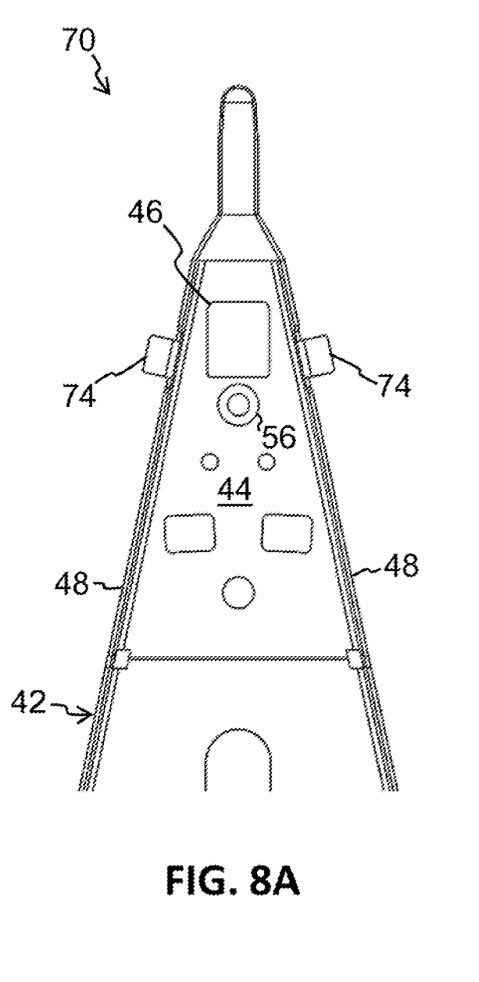
FIG. 8A is a top plan view of a load beam incorporating at least one load beam limiter tab, in accordance with an alternative example of the disclosure.
Figure 8B:
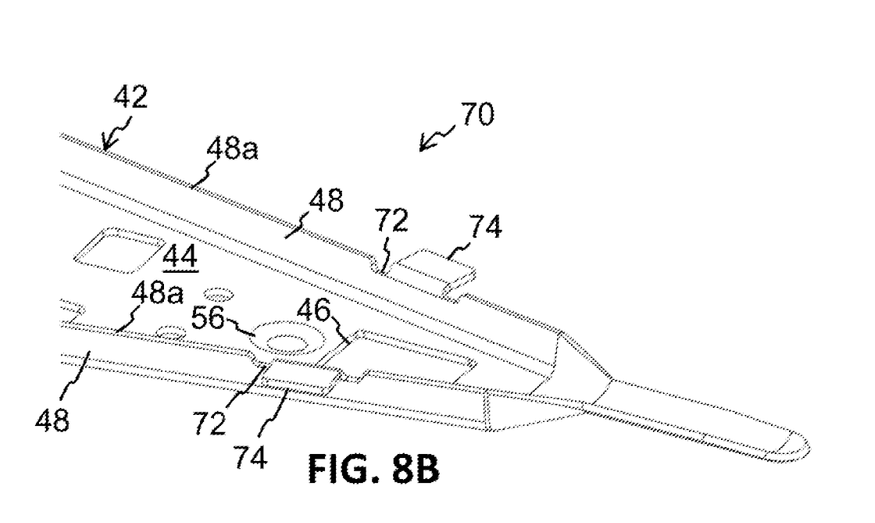
FIG. 8B is an isometric view of the suspension of FIG. 8A, in accordance with an alternative example of the disclosure.
Figure 8C:
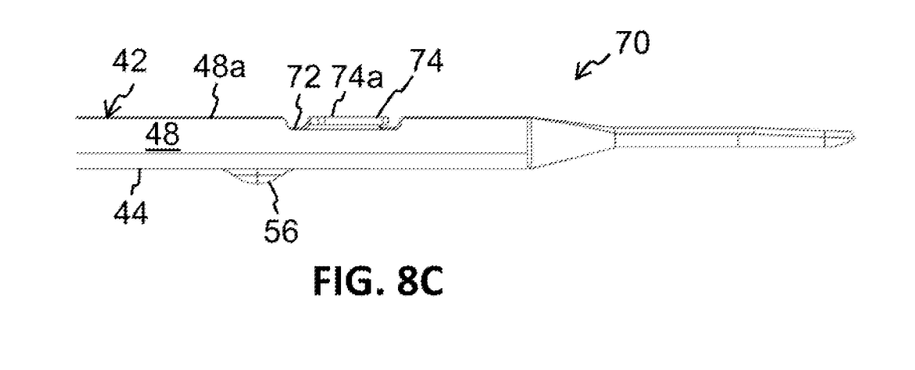
FIG. 8C is a side view of the suspension of FIG. 8A, in accordance with an alternative example of the disclosure.

FIGS. 8A-8C illustrate an alternate example with suspension 70 that is similar to the above described suspension 40 (with like numbers indicating like features), except that the distal edges 48 of side rails 48 include a notch 72 from which a tab 74 laterally extends, where each tab 74 on each side rail 48 extends laterally outwardly (i.e., laterally away from the base portion 44) in a lateral direction generally parallel to the plane of the base portion 44. In this configuration, the top surface 74a of the tab 74 can be even with or below the distal edge 48a of side rails 48. With this configuration, a clearance between tabs 74 is the same as the clearance between distal edges 48a of the side rails 48. Additionally, the notches 72 helps reduce buckling during the tab formation process. The notch 72 can be controlled so that it has only a minor impact on the torsional modes of the load beam 42 including mode frequency and mode gain.

Figure 9A:
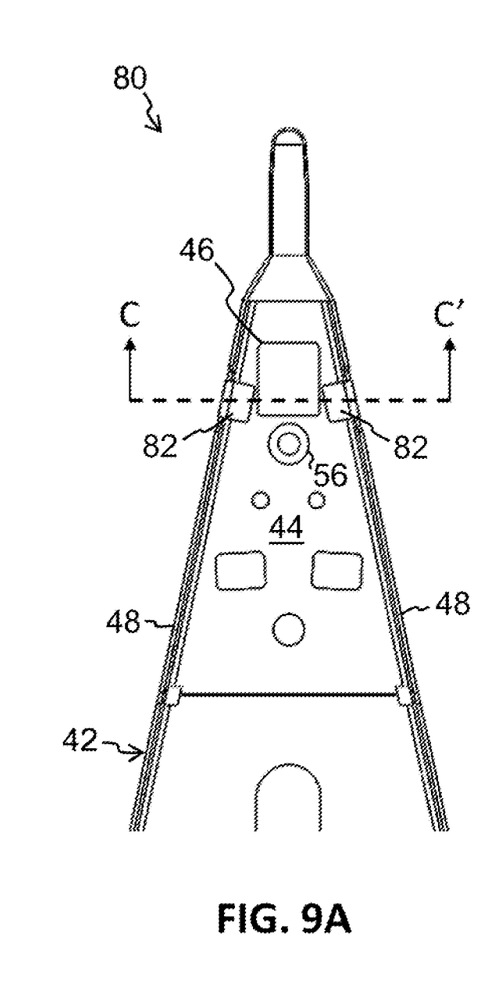
FIG. 9A is a top plan view of a load beam incorporating at least one load beam limiter tab, in accordance with an alternative example of the disclosure.
Figure 9B:
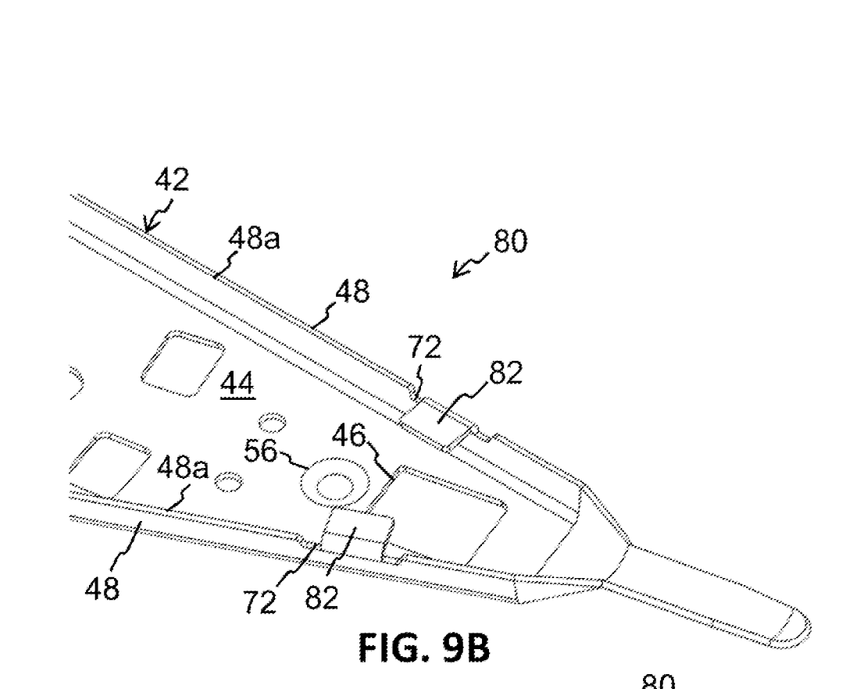
FIG. 9B is an isometric view of the suspension of FIG. 9A, in accordance with an alternative example of the disclosure.
Figure 9C:
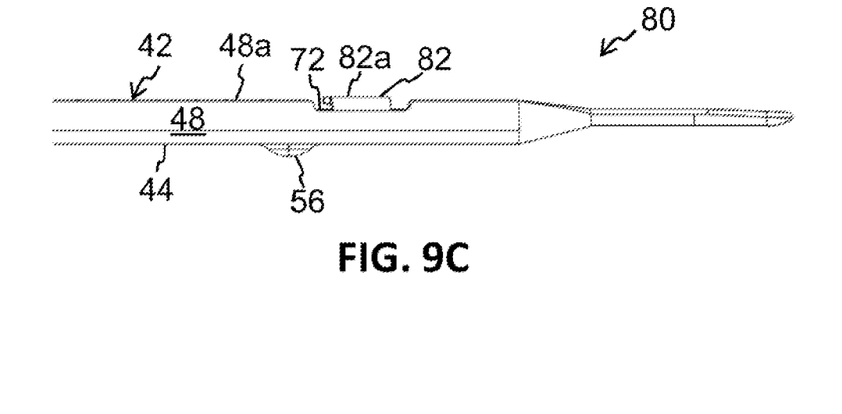
FIG. 9C is a side view of the suspension of FIG. 9A, in accordance with an alternative example of the disclosure.

FIGS. 9A-9C illustrate an alternate example with suspension 80 that is similar to the above described suspension 70 (with like numbers indicating like features), except that tabs 82 laterally extend from notches 72 such that each tab 82 on each side rail 48 extends laterally inward (i.e., toward the base portion 44 so that the tab 82 extends over the base portion 44), as opposed to laterally outward as is the case with suspension 70 described above. Tabs 82 serve to collide in the same manner as described above with respect to tabs 60 and 74 (i.e., top surfaces 82a thereof collide during a shock event).

Figure 10A:
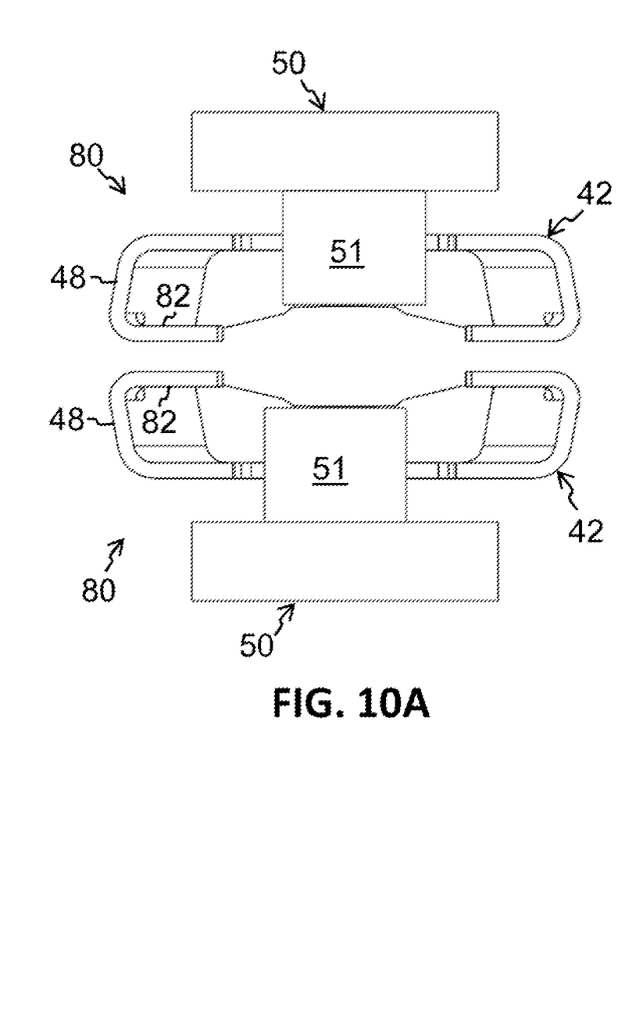
FIG. 10A is a cross-sectional side view at C-C' of FIG. 9A, illustrating a pair of the suspensions of FIG. 9A disposed in an opposing configuration.
Figure 10B:
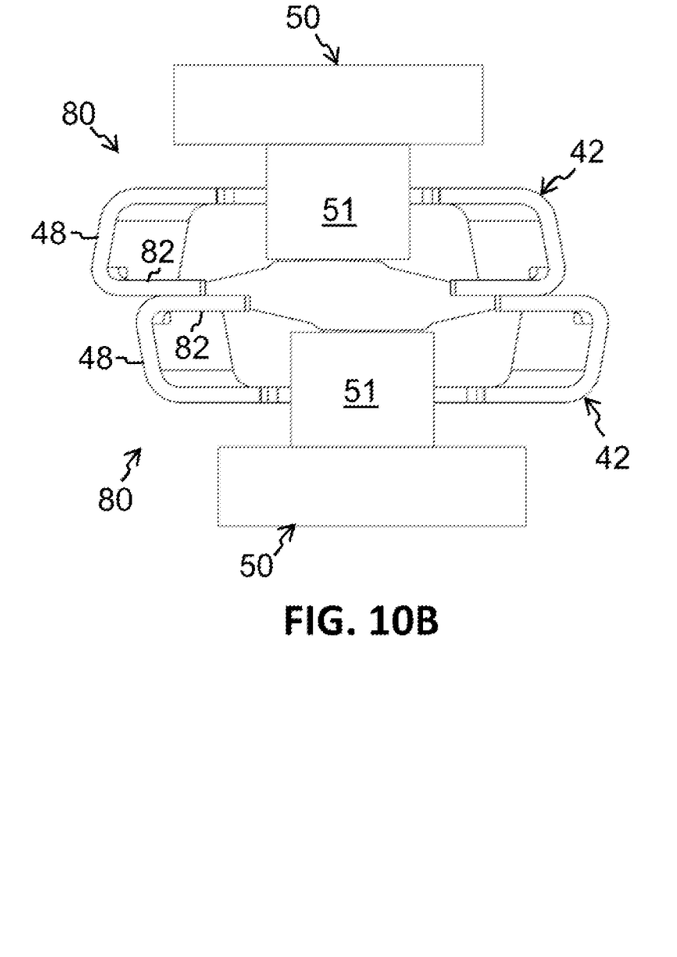
FIG. 10B is a cross-sectional side view of the pair of the opposing suspensions of FIG. 10A, in contact with each other and in a misaligned state.

FIGS. 10A-10B are cross-sectional views along line C-C' of FIG. 9A illustrating the pair of opposing suspensions 80 of FIG. 9A. FIG. 10A shows the opposing suspensions 80 aligned to, and separated from, each other. FIG. 10B shows the result of a shock event in which the opposing suspensions 80 do not remain aligned to each other at the time they collide with each other, in which case the tabs 82 of the opposing suspensions 80 collide together and absorb the energy of the collision despite the misalignment between the opposing suspensions 80, thus preventing the HAMR head slider submounts 51 and/or laser light sources 52 colliding with each other and incurring damage.

Figures 11, 12:
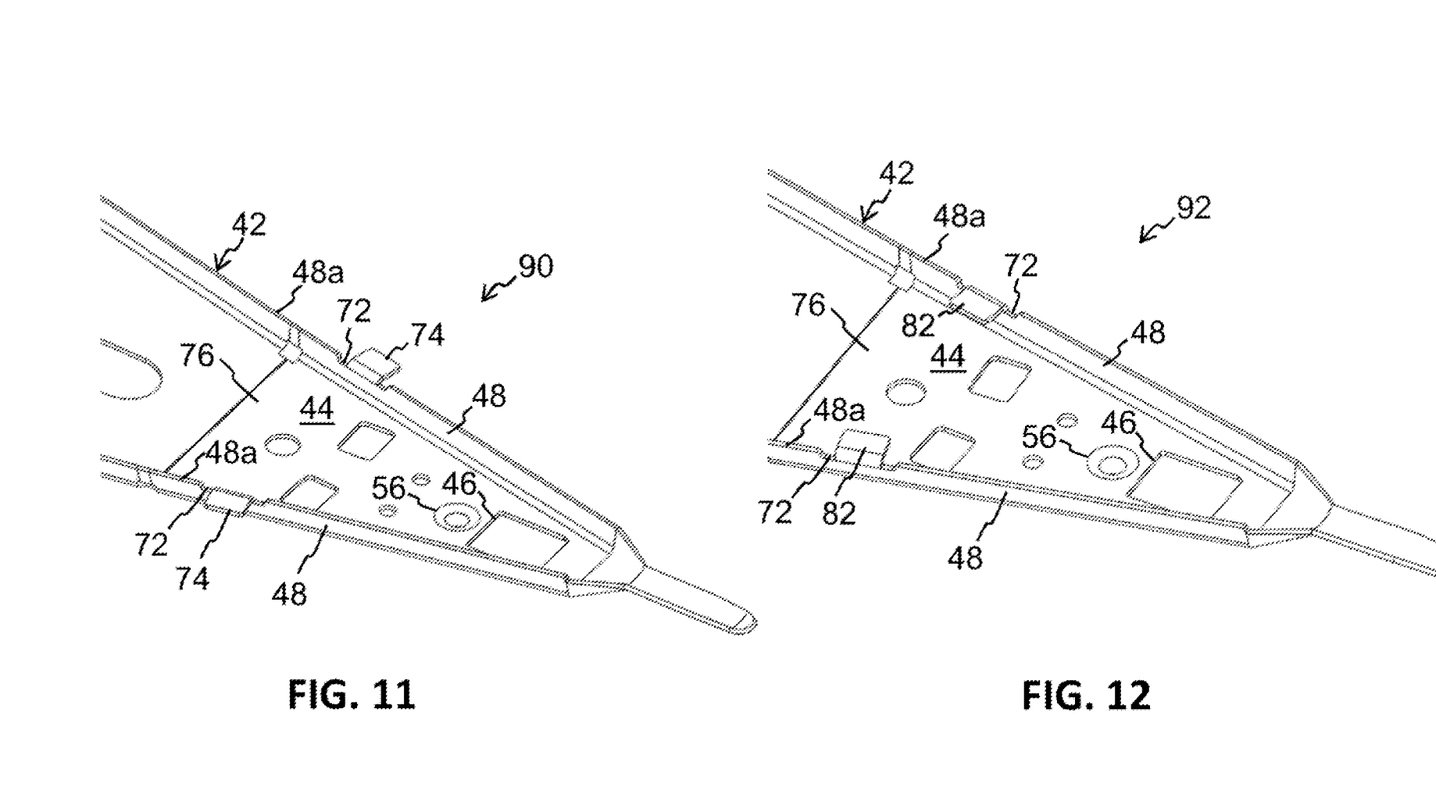
FIG. 11 is an isometric view of a load beam, in accordance with an alternative example of the disclosure.
FIG. 12 is an isometric view of a load beam, in accordance with an alternative example of the disclosure.

While it can be ideal to locate the load beam limiter tabs near the HAMR head slider submount and laser light source, the locations of the load beam limiter tabs along the distal edge 48a of the side rails 48 can vary, so long as the locations match on opposing suspensions to ensure the load beam limiter tabs contact each other in case of any collision between the opposing suspensions. For example, FIG. 11 illustrates suspension 90 that is similar to the above described suspension 70 (with like numbers indicating like features), except that notches 72 and tabs 74 are positioned closer to the proximal end of load beam 42 and/or closer to a sag area 76 of the load beam 42 (i.e. tabs 74 are still disposed between the sag area 76 and the distal end of the load beam 42), without compromising the HAMR head slider protection during a shock event. Similarly, FIG. 12 illustrates suspension 92 that is similar to the above described suspension 80 (with like numbers indicating like features), except that notches 72 and tabs 82 are positioned closer to the proximal end of load beam 42 and/or closer to a sag area 76 of the load beam 42 (i.e. tabs 74 are still disposed between the sag area 76 and the distal end of the load beam 42), without compromising the HAMR head slider protection during the shock event.

Figure 13A:
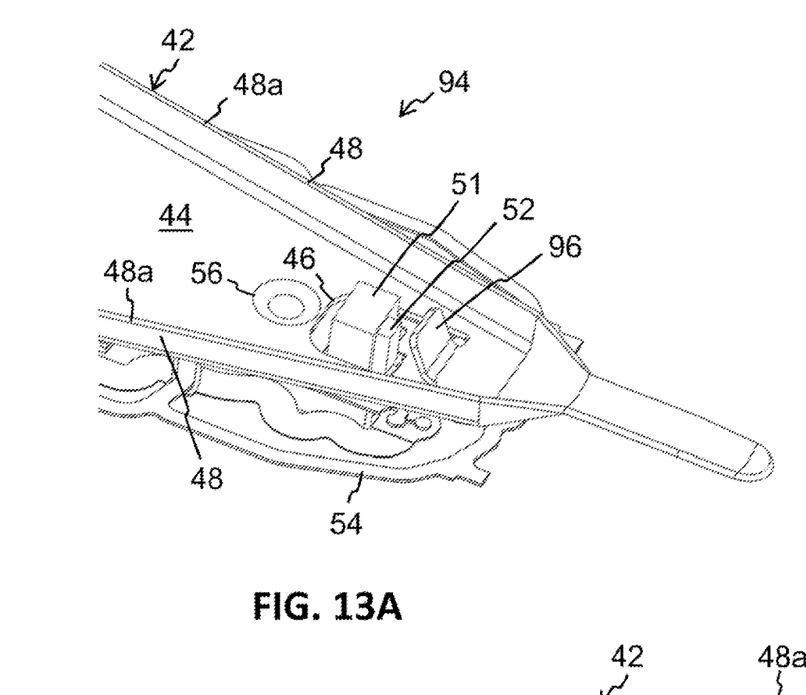
FIG. 13A is an isometric view of a suspension, in accordance with an alternative example of the disclosure.
Figure 13B:
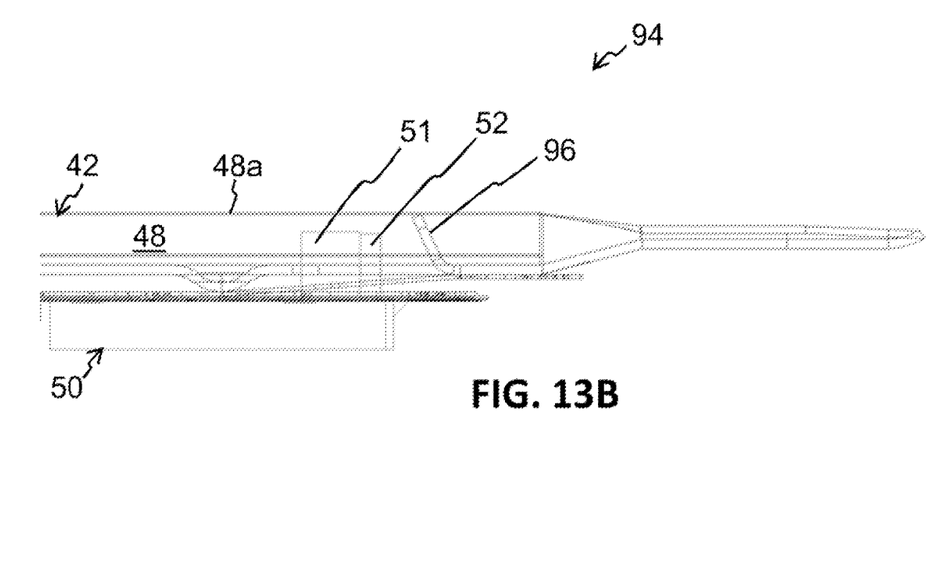
FIG. 13B is side view of a load beam of FIG. 13A, in accordance with an example of the disclosure.

FIGS. 13A-13B illustrate an alternate example with suspension 94 that is similar to the above described suspension 40 (with like numbers indicating like features), except that instead of including tabs 60 extending from the distal edges 48a of the side rails 48, suspension 94 includes a tab 96 extending from an edge of opening 46. Tab 96 extends higher (i.e., further away) from the base portion 44 than do the HAMR head slider submount 51 and the laser light source 52, but can be even with (i.e., extend an equal distance away from the base portion 44), or slightly lower than, the side rails 48. With this configuration, collisions with opposing suspensions 94 aligned with each other can involve collisions between the side rails 48, and collisions with opposing suspensions 94 not aligned with each other can involve collisions between tabs 96 of the opposing suspensions 94. In either case, damage to the HAMR head slider 50 and/or laser light source 52 is avoided.

Figures 14A, 14B:
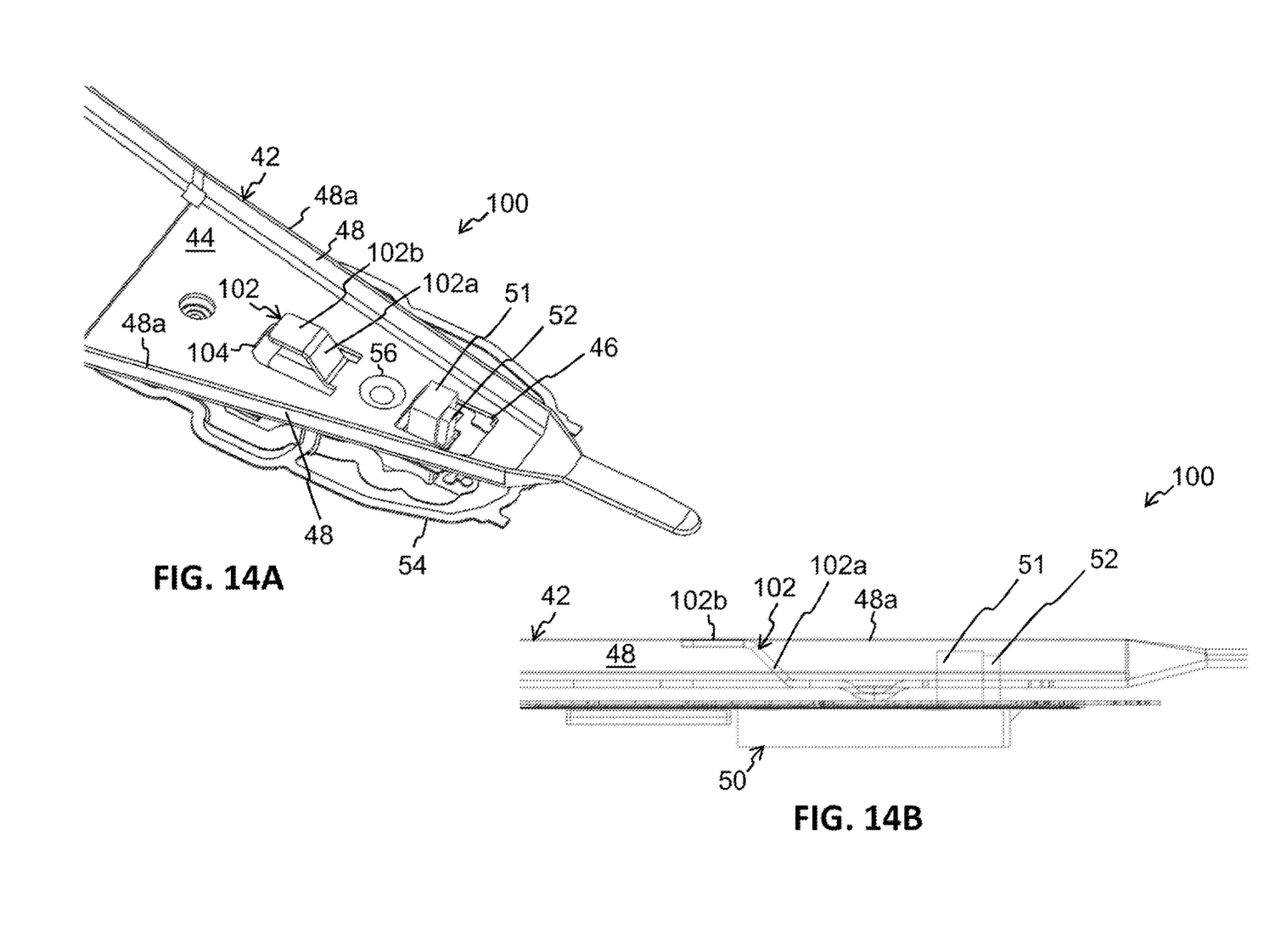
FIG. 14A is an isometric view of a suspension, in accordance with an alternative example of the disclosure.
FIG. 14B is side view of a load beam of FIG. 14A, in accordance with an example of the disclosure.

FIGS. 14A-14B illustrate an alternate example with suspension 100 that is similar to the above described suspension 40 (with like numbers indicating like features), except that instead of including tabs 60 extending from the distal edges 48a of the side rails 48, suspension 100 includes a tab 102 extending from an edge of an opening 104 formed in the base portion 44, where opening 104 is positioned closer to the proximal end of the load beam 42 than opening 46 (i.e., dimple 56 is positioned between opening 104 from which tab 102 extends and opening 46 through which HAMR head slider submount 51 and laser light source 52 extend). Tab 102 can include an inclined section 102a extending up from the base portion 44, and a distal section 102b that is generally planar and extends generally parallel to the plane of base portion 44 and over the opening 104. Tab 102 extends higher (i.e., further away) from the base portion 44 than do the HAMR head slider submount 51 and the laser light source 52, but can be even with (i.e., extend an equal distance away from the base portion 44), or slightly lower than, the side rails 48. With this configuration, collisions with opposing suspensions 100 aligned with each other can involve collisions between the side rails 48, and collisions with opposing suspensions 100 not aligned with each other can involve collisions between tabs 102 of the opposing suspensions 100. In either case, damage to the HAMR head slider submount 51 and/or laser light source 52 is avoided.

It will be understood that the disclosed examples of the disclosure are based on gimbal micro-actuator suspension. The present disclosure may be applied into other milli-actuator suspensions or tri-stage actuator suspensions.

Terms such as "upper," "lower," "above," "best," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present disclosure" as used herein should not be construed to mean that only a single disclosure having a single essential element or group of elements is presented. Similarly, it will also be appreciated that the term "present disclosure" encompasses a number of separate innovations, which can each be considered separate disclosures. Although the present disclosure has been described in detail with regards to the preferred examples and drawings thereof, it should be apparent to those skilled in the art that various adaptations and modifications of examples of the present disclosure may be accomplished without departing from the spirit and the scope of the disclosure.

We claim:

1. A load beam comprising;
  a base portion with an opening formed therein, and a pair of side rails extending from the base portion, wherein each of the side rails terminates in a distal edge; and
  the opening configured to receive a head slider extending through the opening;
  wherein each of the distal edges include a tab disposed on each of the distal edges, wherein for each of the distal edges, the distal edge includes a notch, and wherein the tab extends from the notch, each tab comprising a first portion extending upward from the load beam in a first direction and a second portion extending laterally outward from the first portion.

2. The load beam of claim 1, wherein the head slider is a heat assisted magnetic recording (HAMR) head slider.

3. The load beam of claim 1 wherein the tab extends further away from the base portion than does the head slider when extending through the opening.

4. A suspension comprising:
  a load beam comprising a base portion with an opening formed therein, and a pair of side rails extending from the base portion, wherein each of the side rails terminates in a distal edge; and
  the opening configured to receive a heat assisted magnetic recording (HAMR) head slider extending through the opening;
  wherein each of the distal edges include a tab disposed on each of the distal edges, wherein for each of the distal edges, the distal edge includes a notch, and wherein the tab extends from the notch, each tab comprising a first portion extending upward from the load beam in a first direction and a second portion extending laterally outward from the first portion in a second direction.

5. The suspension of claim 4, wherein the base portion of the load beam includes a dimple, and wherein the tabs are positioned on the distal edges between the dimple and a distal end of the load beam, and the opening is positioned between the dimple and the distal end of the load beam.

6. The suspension of claim 4, wherein for each of the distal edges, the tab extends away from the base portion.

7. The suspension of claim 4, wherein for each of the distal edges, the tab extends over the base portion.

8. The suspension of claim 4, wherein each of the tabs includes a top surface that is parallel to the base portion of the load beam.

9. The suspension of claim 8, wherein for each of the distal edges, the top surface of the tab is offset from the distal edge by a distance D1.

10. The suspension of claim 8, wherein for each of the distal edges, the top surface of the tab is disposed further away from the base portion than a top surface of the heat assisted magnetic recording (HAMR) head slider.

11. The suspension of claim 4, wherein the load beam includes a sag area, and wherein the tabs are positioned between the sag area and a distal end of the load beam.

* * * * *